(12) United States Patent
Moon et al.

(10) Patent No.: US 7,766,173 B2
(45) Date of Patent: Aug. 3, 2010

(54) POLYAMIDE REVERSE OSMOSIS COMPOSITE MEMBRANE AND PREPARATION METHOD THEREOF

(75) Inventors: Moo-Kyung Moon, Seoul (KR); Je-Kang Yoo, Seoul (KR); Sun-Yong Lee, Seoul (KR); Youn-Kook Kim, Seoul (KR); Hyoung-Jun Ahn, Seoul (KR); Doo-Won Han, Seoul (KR)

(73) Assignee: Woongjincoway Co., Ltd., Kongju (KR)

( * ) Notice: Subject to any disclaimer, the term of this patent is extended or adjusted under 35 U.S.C. 154(b) by 0 days.

(21) Appl. No.: 11/996,030

(22) PCT Filed: Aug. 24, 2005

(86) PCT No.: PCT/KR2005/002789

§ 371 (c)(1),
(2), (4) Date: Jan. 17, 2008

(87) PCT Pub. No.: WO2007/013710

PCT Pub. Date: Feb. 1, 2007

(65) Prior Publication Data

US 2008/0237118 A1  Oct. 2, 2008

(30) Foreign Application Priority Data

Jul. 27, 2005 (KR) .................. 10-2005-0068203

(51) Int. Cl.
*B01D 39/00* (2006.01)
*B01D 39/14* (2006.01)
*B01D 61/00* (2006.01)
*B01D 11/00* (2006.01)

(52) U.S. Cl. .................. 210/500.38; 210/634; 210/653

(58) Field of Classification Search ............ 210/500.38, 210/653, 634, 649, 650, 652
See application file for complete search history.

(56) References Cited

U.S. PATENT DOCUMENTS

| | | | |
|---|---|---|---|
| 3,808,303 A | 4/1974 | Ganci et al. | |
| 4,277,344 A | 7/1981 | Cadotte | |
| 4,872,984 A | 10/1989 | Tomaschke | |
| 4,950,404 A | 8/1990 | Chau | |
| 4,983,291 A | 1/1991 | Chau et al. | |
| 5,755,964 A | 5/1998 | Mickols | |
| 6,245,234 B1 | 6/2001 | Koo et al. | |
| 6,368,507 B1 | 4/2002 | Koo et al. | |

*Primary Examiner*—Vickie Kim
*Assistant Examiner*—Katherine Zalasky
(74) *Attorney, Agent, or Firm*—Birch, Stewart, Kolasch & Birch, LLP

(57) ABSTRACT

An amine aqueous solution for forming an active layer of a polyamide reverse osmosis composite membrane is prepared, which consists of 0.1 through 20 weight % of polyfunctional aromatic amine monomer, 0.1 through 20 weight % of multi-functional tertiary alcohol amine, 0.1 through 20 weight % of strong acid, and 40 through 99.7 weight % of water.

9 Claims, No Drawings

POLYAMIDE REVERSE OSMOSIS COMPOSITE MEMBRANE AND PREPARATION METHOD THEREOF

TECHNICAL FIELD

The present invention relates to a polyamide reverse osmosis composite membrane and a preparation method thereof, and in particular to an improved polyamide reverse osmosis composite membrane having enhanced water permeability and high salt rejection rate and a preparation method thereof.

BACKGROUND ART

Water as well as air is a necessary element so that all lives including human live in health. A proper amount and quality of water are important to human. As sciences and industries advance, and the applicable ranges of water resources get widened, the importance of water grows. Obtaining good quality water resources is very important so as to keep all lives safe and healthy. People are suffering from the shortage of water and water pollution. Here, it seems very difficult to obtain enough water resources around us. According to a result of the UN's survey conducted on water problem, it is reported that 1,200 million persons, ⅕ of the total world population, are suffering from the shortage of drinkable water. 2,400 million persons, about double of the above number, drink water without a proper drainage system in their regions. As a result of the above-mentioned poor water management system, more than 3 million persons throughout the world are dying every year.

Seawater occupies more than 70% of the total amount of water. But seawater contains many impurities such as salts, etc., therefore it is impossible to directly use seawater for industry, agriculture, and home, etc. Here, it is needed to freshen seawater by removing impurities such as salts and other substances from seawater or salt-melted water in order to actually use seawater in our lives. During the above seawater freshening process, a reverse osmosis composite membrane has been used as a major element.

A conventional reverse osmosis composite membrane is constituted in such a manner that thin active layers lie at a porous support. In particular, a polyamide active layer is formed by an interfacial polymerization using polyfunctional amine and poly-functional acylhalide. The polyamide composite membrane is disclosed in the U.S. Pat. No. 4,277,344 of Cadotte in 1981. According to the above U.S. Pat. No. '344, it discloses an aromatic polyamide active layer based on an interfacial polymerization between polyfunctional aromatic amine having at least two primary amine groups and poly-functional acylhalide having at least three acylhalide groups. According to the above U.S. Pat. No. '344, a polysulfone support is submerged in aqueous solution of meta-phenylene diamine, and surplus meta-phenylene diamine (MPD) aqueous solution is removed from the surface of the support. Freon solution containing dissolved trimesoyl chloride (TMC) is coated, so that interfacial polymerization is performed for 10 seconds. A reverse osmosis composite membrane is dried at room temperature after interfacial polymerization is finished. The thusly-prepared reverse osmosis composite membrane has a high permeability and a high salt rejection. Many researches have been conducted for enhancing permeability and a salt rejection.

As one example among the above researches, according to the U.S. Pat. No. 4,872,984 by Tomaschke in 1989, a reverse osmosis composite membrane is prepared based on an interfacial polymerization by contacting organic solution at an interface, with the organic solution consisting of polyfunctional aromatic amine monomer having at least two reactive amine groups on a porous support, aqueous solution with amine salt compound formed by monomeric amine and strong acid and aromatic poly-functional acylhalide compound. At this time, monomeric amine salt compound contained in aqueous solution is monomeric tertiary amine salt formed by monomeric amine and strong acid or quaternary amine salt. Here, in monomeric tertiary amine group among the amines, trimethylamine, triethylamine and triprophylaminem are used as trialkylamine group. 1-methylpiperidine is used as N-alkylcyclo aliphatic amine group. N,N-dimethylethylamine and N,N-diethylmethylamine are used as N,N-dialkylamine group. N,N-dimethylethanolamine is used as N,N-dialkylethanolamine group. In quaternary amine group, tetramethylammonium hydroxide and tetraethylammonium hydroxide are used as tetra alkyl ammonium hydroxide group. Benzyltriethylammonium hydroxide and benzyltriprophylhydroxide or mixture thereof is used as benzylalkylammonium hydroxide group. The chemical structures of (1) monomeric tertiary amine salt and (2) quaternary amine salt disclosed in the Tomaschke patent are as follows.

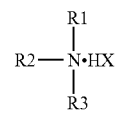

[Formula 1]

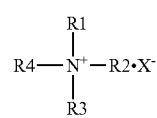

[Formula 2]

In the above formulas 1 and 2, R1 through R4 represent hydrocarbons, which are same with each other or are different, and HX represents strong acid, with X representing a certain material consisting of halide nitrate, phosphate, sulfonate, carboxylate, halogenated carboxylate and oxide haloacid derivative.

In another conventional example, the U.S. Pat. No. 5,576,057 by Hirose discloses a reverse osmosis composite membrane. In this patent, a flux improvement of membrane is achieved by adding alcohol into amine aqueous solution by 10-50 weight %. At this time, alcohol used is preferably selected from the group comprising ethanol, propanol, butanol, butyl alcohol, 1-pentanol, 2-pentanol, isobutyl alcohol, isopropyl alcohol, 2-ethylbutanol, 2-ethylhexanol, octanol, cyclohexanol, tetrahydrofurfuryl alcohol, neopentyl glycol, t-butanol, benzyl alcohol, 4-methyl-2-phentanol, 3-methyl-2-butanol, pentyl alcohol, aryl alcohol, ethylene glycol, diethylene glycol, triethylene glycol, tetraethylene glycol, propandiol, butanediol, pentanediol, hexanediol and glycerol, and mixture thereof. However, in a preparation of a reverse osmosis composite membrane, which is performed by adding alcohol into a first solution, a solubility difference between a first solution and a second solution should be in a range of 7~15 $(cal/cm^3)^{1/2}$, and in the case that the difference is above 15 $(cal/cm^3)^{1/2}$, an active layer is formed based on an interfacial polymerization at the surfaces of two solutions, but water permeability decreases. In the performance of a polyamide reverse osmosis composite membrane prepared by the above method, permeability is 29~42[LMH], and rejection rate is 99.4%~99.5%, which are excellent as compared to the results that permeability is 25[LMH], and rejection rate is 99.6, with the results being obtained in the case that alcohol is not added. When a small amount of alcohol is added, the effects are much less, as compared to the performance of the conventional polyamide reverse osmosis composite membrane. When a lot of alcohol is added, polymerization reaction did not perform at an interface due to a decrease in a solubility difference between amine aqueous solution and acylhalide organic solution, so that a salt rejection of a prepared polyamide reverse osmosis composite membrane decreases.

In further another example of the conventional art, according to the U.S. Pat. No. 4,950,404 by Chau, a reverse osmosis composite membrane is prepared based on an interfacial polymerization at a surface of a support in such a manner that polarity aprotic solvent is added into amine aqueous solution and is contacted with organic solution which contains polyfunctional acylhalide. Here, the polarity aprotic solvent is selected from the group comprising N-methylpyrrolidone, 2-pyrrolidone, N,N-dimethylformamide, dioxane, pyrridine, lutidine, picoline, tetrahydrofuran, sulfolane, sulfolene, hexamethylphosphoamide, triethylphosphite, N,N-dimethylacetamide and N,N-dimethylpropionamide.

According to the U.S. Pat. No. 4,983,291 by Chau, a reverse osmosis composite membrane is contacted with solution having acid such as ascorbic acid, hydrochloric acid, citric acid, sulfamic acid, tartaric acid, ethylenediaminetetraacetic acid, p-toluenesulfonic acid, L-lysine hydrochloride, and glycine and is processed through a post-treatment and is dried at a certain temperature (room temperature ~170° C.) for 1~120 minutes. However, when aprotic solvent is added so that the prepared polyamide reverse osmosis composite membrane has high water permeability, the composition ratio of aprotic solvent increases, so that the salt rejection of reverse osmosis composite membrane relatively decreases. In the case of the reverse osmosis composite membrane prepared in such a manner that the prepared reverse osmosis composite membrane is contacted with solution having acid and is dried at 100° C., the performance of the membrane becomes bad when a small amount of acid is added. When a lot of acid is added, the water permeability of the membrane is enhanced, and the salt rejection relatively decreases. In addition, in the case that the reverse osmosis composite membrane is dried at a high temperature of 170° C., the water permeability decreases after the reverse osmosis composite membrane is contacted with the solution containing acid.

As still further another example of the conventional art, according to the U.S. Pat. No. 6,245,234 by Ja-Young Koo in 2001, a reverse osmosis composite membrane is prepared based on an interfacial polymerization in such a manner that aqueous solution having dissolved aromatic polyfunctional amine monomers, which each have at least two reactive amine groups, strong acid and polyfunctional tertiary amine and polar solvent on a porous support, is contacted with organic solution containing poly-functional acylhalide, polyfunctional sulfonyl halide or polyfunctional isocyanate. Here, the polyfunctional tertiary amine is selected from the group comprising N,N,N',N'-tetramethyl-1,6-hexanediamine, N,N,N',N'-tetramethyl-1,4-butanediamine, N,N,N',N'-tetramethyl-2-buten-1,4-diamine, N,N,N',N'-tetramethyl-1,3-butanediamine, N,N,N',N'-tetramethyl-1,3-propanediamine, N,N,N',N'-tetramethyl-1,8-octanediamine, N,N,N',N'-tetramethyl-1,7-heptanediamine, N,N,N',N'-tetramethyl-1,5-pentanediamine, N,N,N',N'-tetraethyl-1,4-butanediamine, N,N,N',N'-tetraethyl-1,3-butanediamine, N,N,N',N'-tetraethyl-1,3-propanediamine, 1,4-dimethylpiperazine, and N,N,N',N'-tetraethylethylenediamine. Here, the mole ratio of tertiary amine and strong acid is in a range of 1:0~1:1.

In addition, according to the U.S. Pat. No. 6,368,507 by Ja-Young Koo in 2002, a reverse osmosis composite membrane is prepared based on a reaction between amine aqueous solution containing salt compound consisting of polyfunctional amine, polar solvent, polyfunctional tertiary amine salt and tertiary amine and organic solution containing polyfunctional acylhalide, polyfunctional sulfonyl halide or polyfunctional isocyanate. Here, the mole ratio of polyfunctional tertiary amine and strong acid ranges from 1:1 to 1:n, which is less than the number (n) of amine groups of polyfunctional tertiary amine. The formula of polyfunctional tertiary amine disclosed by Ja-Young Koo is as the following formula 3.

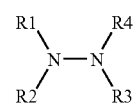

[Formula 3]

Here, the polyfunctional tertiary amine consists of 2~10 carbons of main alkane chain, and side chain of main alkane chain consists of at least two tertiary amines.

According to the U.S. Pat. No. 5,755,964 by Mickols in 1998, the permeability of an reverse osmosis composite membrane is enhanced by 10% in such a manner that reverse osmosis composite membrane is contacted with amine of which 1~3 alkyl groups consisting of 1~2 carbons are constituted with 1~3 ammonias, or amine aqueous solution of which alkyl groups is replaced with hydroxy, phenyl, amino group, or mixture thereof in order to enhance water permeability of reverse osmosis composite membrane. Here, amine is selected from the group comprising trimethylamine, ethanolamine, ammonia, triethanolamine, dimethylamine, N,N-dimethylethanolamine, methylamine, and ethylenediamine.

DISCLOSURE OF INVENTION

Technical Problem

The method for enhancing water permeability of conventional polyamide reverse osmosis composite membrane may be classified into the following two categories. First, a certain additive such as amine salt or alcohol is added into amine solution. In one method, monomeric tertiary amine or strong acid or quaternary amine salt is added into amine aqueous solution. In another method, polyfunctional tertiary amine salt formed of strong acid and polar solvent are added into amine aqueous solution. In another method, polar aprotic solvent or alcohol is added into amine aqueous solution. Second, as a post-treatment method of reverse osmosis composite membrane, amine aqueous solution is contacted with the surface of a polyamide reverse osmosis composite membrane. Here, the alkyl group of the tertiary amine is replaced with hydroxy, phenyl and amino group.

However, in the above two methods, it is impossible to enhance both water permeability and salt rejection by desired degrees at the same time.

Technical Solution

It is an object of the present invention to provide amine aqueous solution for forming an active layer of a polyamide reverse osmosis composite membrane having improved water permeability and salt rejection, by using multifunctional tertiary alcohol amine having at least two tertiary amines each having alcohol group as additive inputted into amine aqueous solution.

It is another object of the present invention to provide a preparation method of polyamide reverse osmosis composite membrane prepared by adding multifunctional tertiary alcohol amine into amine aqueous solution as an additive.

It is still another object of the present invention to provide a polyamide reverse osmosis composite membrane prepared by the above method.

To achieve these objects, the present invention provides amine aqueous solution for forming an active layer of a polyamide reverse osmosis composite membrane, with the amine aqueous solution consisting of 0.1~20 weight % of polyfunctional aromatic amine monomer, 0.1~20 weight % of multifunctional tertiary alcohol amine, 0.1~20 weight % of strong acid, and 40~99.7 weight % of water.

To achieve these objects, the present invention also provides a preparation method of a polyamide reverse osmosis composite membrane, and the method comprises a process A of (a) preparing amine aqueous solution consisting of 0.1~20 weight % of polyfunctional aromatic amine monomer, 0.1~20 weight % of multifunctional tertiary alcohol amine, 0.1~20 weight % of strong acid, and 40~99.7 weight % of water; and (b) forming an active layer through interfacial polymerization of amine aqueous solution and organic solution of amine reactive compound containing 0.01~10 weight % of polyfunctional acylhalide monomer on a surface of a porous support; and a process B in which an active layer of a reverse osmosis composite membrane generated by the interfacial polymerization is contacted with aqueous solution containing 0.1~100 weight % of multifunctional tertiary alcohol amine; and a process C in which the reverse osmosis composite membrane is dried.

ADVANTAGEOUS EFFECTS

The present invention discloses a polyamide reverse osmosis composite membrane and a preparation method thereof, and particularly an improved polyamide reverse osmosis composite membrane having enhanced water permeability and high salt rejection rate and a preparation method thereof.

BEST MODE FOR CARRYING OUT THE INVENTION

The inventors of the present invention have found out that it is possible to significantly enhance salt rejection and water permeability by in such a manner that multifunctional tertiary alcohol amine and strong acid, which have never been used as additives in the conventional art, are concurrently inputted into amine aqueous solution as additives as compared to the conventional art in which a reverse osmosis composite membrane is prepared by adding tertiary amine salt or various additives such as alcohol, etc.

The amine aqueous solution of the present invention includes 0.1~20 weight % of polyfunctional aromatic amine monomer, 0.1~20 weight % of multifunctional tertiary alcohol amine, 0.1~20 weight % of strong acid, and 40~99.7 weight % of water, which are added as necessary components.

It is preferable that the multifunctional aromatic amine monomer added in amine aqueous solution is selected from the group consisting of 1,4-phenylenediamine, 1,3-phenylenediamine, 2,5-diaminotoluene, diphenyl diamine, 4-methoxy-m-phenylenediamine and mixture thereof. The preferable amount of the multifunctional aromatic amine monomer is 0.1~20 weight % in the amine aqueous solution, and the more preferable amount of the polyfunctional aromatic amine monomer is 0.5~5 weight % in the amine aqueous solution. In general, the pH of the amine aqueous solution containing polyfunctional aromatic amine monomer is adjusted to be in a range of 7~13. The pH also can be adjusted by adding basic acid receptor. The preferable examples of basic acid receptor are hydroxide, carboxylate, carbonate, borate, alkali metal phosphate, trialkyl amine, etc.

The multifunctional tertiary alcohol amine added in amine aqueous solution as an additive is preferably selected from the group consisting of N,N,N',N'-tetrakis(2-hydroxyl propyl) ethylenediamine, N,N,N',N'-tetrakis(2-hydroxyethyl)ethylenediamine), N,N,N',N'',N'''-pentakis(2-hydroxypropyl)diethylenetriamine), 2,2',2'',2'''-ethylenedinitrilotetraethanol and mixture thereof. The preferable amount of the multifunctional tertiary alcohol amine is 0.1~20 weight % in the amine aqueous solution and the more preferable amount of the multifunctional tertiary alcohol amine is 0.5~5 weight % in the amine aqueous solution. The preferable chemical structures of the multifunctional tertiary alcohol amine according to the present invention are the following formulae 4~5. As seen in Formulae 4 and 5, the multifunctional tertiary alcohol amine according to the present invention comprise at least two tertiary amines connected to main hydrocarbon alkane chains. Here, hydrocarbon side chain of tertiary alcohol amine includes at least one alcohol group, and as seen in Formula 5, hydrocarbon side chain of tertiary alcohol amine includes at least one tertiary amine. Hydrocarbon side chain of tertiary amine or hydrocarbon side chain of substituted tertiary amine includes at least one alcohol group. It is noted that R represents alcohol group in the following formulae 4 and 5. Therefore, in the present invention, it is preferable that alcohol group is positioned at a side chain in a multifunctional tertiary alcohol amine structure in order to prevent a decrease of salt rejection rate of prepared polyamide reverse osmosis composite membrane.

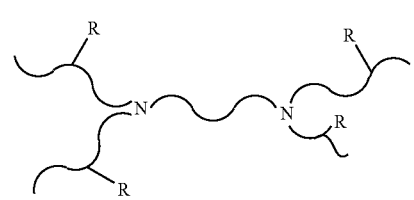

[Formula 4]

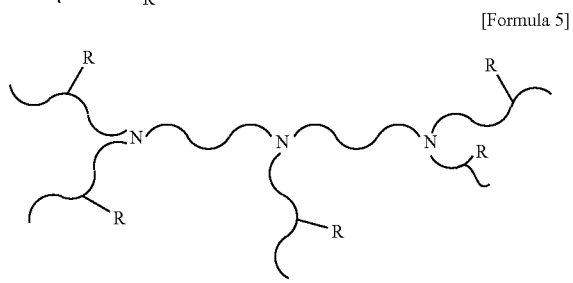

[Formula 5]

The water permeability and salt rejection of polyamide reverse osmosis composite membrane of the present invention can be significantly enhanced by the influences of alcohol group, and also multifunctional tertiary alcohol amine salt generated by strong acid also helps to enhance the water permeability and salt rejection of polyamide reverse osmosis composite membrane of the present invention.

The strong acid added in the amine aqueous solution helps to induce a generation of multifunctional tertiary alcohol amine salt when the strong acid is added into the amine aqueous solution. The preferable strong acid is selected from the group consisting of methanesulfonic acid, toluenesulfonic acid, camphorsulfonic acid, ethanesulfonic acid, benzenesulfonic acid and mixture thereof. The preferable amount of the strong acid is 0.1~20 weight %, and more preferable amount of the strong acid is 0.5~5 weight %. The amount of the multifunctional tertiary alcohol amine salt generated by adding strong acid into the amine aqueous solution depends on the number (n) of tertiary amine groups. The preferable mole ratio of the multifunctional tertiary alcohol amine and strong acid is 1:1 to 1:n.

In addition, the preferable polyfunctional acylhalide, which interfacially polymerizes with the amine aqueous solution, is selected from the group consisting of trimesoyl chloride, terephthaloyl chloride, isophthalolyl chloride and mixture thereof. The preferable amount of the polyfunctional acylhalide is 0.01~10 weight % in the organic solution and the more preferable amount of the polyfunctional acylhalide is 0.05~2.0 weight %. The preferable organic solvent is selected from the group consisting of hexane, cyclohexane, heptane, alkan having 8~12 carbons, halogen substituted hydrocarbon of freon and mixture thereof. Isopar C (Exxon incorporation) organic solution is preferable.

In the method for preparing a polyamide reverse osmosis composite membrane having improved water permeability and salt rejection using amine aqueous solution for forming an active layer of a polyamide reverse osmosis composite membrane according to the present invention, the improvements comprise that an active layer is formed by contacting organic solution of amine reactive compound with amine aqueous solution on a surface of a porous support, and the amine aqueous solution includes 0.1~20 weight % of polyfunctional aromatic amine monomer, 0.1~20 weight % of multifunctional tertiary alcohol amine, 0.1~20 weight % of strong acid and 40~99.7 weight % of water (active layer forming step).

In addition, the organic solution used for forming an active layer of a polyamide reverse osmosis composite membrane by interfacial polymerization with amine aqueous solution preferably includes 0.05~2.0 weight % of amine reactive polyfunctional acylhalide.

The preferable polyfunctional aromatic amine monomer in the amine aqueous solution is selected from the group consisting of 1,4-phenylenediamine, 1,3-phenylenediamine, 2,5-diaminotoluene, diphenyl diamine, 4-methoxy-m-phenylenediamine and mixture thereof. The preferable amount of the polyfunctional aromatic amine monomer is 0.1~20 weight % in the amine aqueous solution and the more preferable amount of the polyfunctional aromatic amine monomer is 0.5~5.0 weight %.

In addition, the multifunctional tertiary alcohol amine used in amine aqueous solution as additive is selected from the group comprising N,N,N',N'-tetrakis(2-hydroxyl propyl)ethylenediamine, N,N,N',N'-tetrakis(2-hydroxylethyl)ethylenediamine, N,N,N',N'',N'''-pentakis(2-hydroxypropyl)diethylenetriamine), and 2,2',2'',2'''-ethylenedinitrilotetraethanol. The added amount of the multifunctional tertiary alcohol amine is preferably 0.1 through 20 weight % of the amine aqueous solution and is more preferably 0.5 through 5 weight %. When the added amount of the multifunctional tertiary alcohol amine in the amine aqueous solution is less than 0.1 weight %, the water permeability of the polyamine reverse composite membrane is not enhanced. On the contrary, when the added amount of the multifunctional tertiary alcohol amine in the amine aqueous solution exceeds 20 weight %, the salt rejection of the reverse osmosis composite membrane decreases.

The strong acid added into the amine aqueous solution makes the multifunctional tertiary alcohol amine become salt. The preferable strong acid is selected from the group consisting of methanesulfonic acid, toluenesulfonic acid, camphorsulfonic acid, ethanesulfonic acid, benzenesulfonic acid and mixture thereof.

The preferable amine reactive multifunctional acylhalide is selected from the group consisting of trimesoyl chloride, terephthaloyl chloride, isophthalolyl chloride and mixture thereof The preferable added amount of the multifunctional acylhalide is 0.01 through 10 weight % in the organic solution and the more preferable amount is 0.05 through 2.0 weight %.

In the method for preparing a polyamide reverse osmosis composite membrane according to the present invention, it is possible to significantly enhance the salt rejection and water permeability of reverse osmosis composite membrane by additionally performing a post-treatment step after an active layer is formed.

Here, the post treatment is performed in such a manner that an active layer of the reverse osmosis composite membrane generated by interfacial polymerization is contacted with aqueous solution which includes 0.1 through 100 weight % of multifunctional tertiary alcohol amine used in the amine aqueous solution as additive after the active layer is formed (in a post treatment step). In the case that the added amount of multifunctional tertiary alcohol amine is 100 weight %, the post treatment is performed with only multifunctional tertiary alcohol amine. The preferable added amount of the multifunctional tertiary alcohol amine in the multifunctional tertiary alcohol amine aqueous solution used in the post-treatment is 1 through 50 weight %. The permeability performance of the polyamide reverse osmosis composite membrane including the multifunctional tertiary alcohol amine aqueous solution contact step is significantly enhanced by performing the post treatment using the multifunctional tertiary alcohol amine used in the amine aqueous solution as additive, as compared to the permeability performance of the conventional polyamide reverse osmosis composite membrane (drying step).

In the method for preparing a polyamide reverse osmosis composite membrane according to the present invention, a drying step can be performed in a state whether the post treatment is performed with multifunctional tertiary alcohol amine aqueous solution or not. The drying step has been conventionally performed at room temperature. However, in the present invention, the preferable drying step is performed at 85 through 150° C. for 10 seconds through 1 hour. When the drying temperature is less than 85° C., it is impossible to obtain a desired adding effect of multifunctional tertiary alcohol amine added in the amine aqueous solution, therefore the water permeability of polyamide reverse osmosis composite membrane is not enhanced. While the drying temperature exceeds 150° C., the polyamide reverse osmosis composite membrane may be contracted, therefore water permeability is significantly decreased. When the drying time is less than 10 seconds, since the multifunctional tertiary alcohol amine aqueous solution of the surface of the polyamide reverse osmosis composite membrane is not fully dried, the performance of the membrane may be slight. While the drying time exceeds one hour, the polyamide reverse osmosis composite membrane may be contracted, therefore the water permeability of the membrane decreases.

In the polyamide reverse osmosis composite membrane according to the present invention, multifunctional tertiary alcohol amine may be used in amine aqueous solution as additive and may be additionally used in the post-treatment. The drying step is performed at high temperature after the post treatment is performed, so t is possible to prepare polyamide reverse osmosis composite membrane having improved water permeability and salt rejection as compared to conventional polyamide reverse osmosis composite membrane.

The preferred embodiments and comparison examples of the present invention will be described. The following embodiments and comparison examples are provided in order to more clarify the present invention, and the contents of the present invention are not limited to the disclosed embodiments and comparison examples.

1. Preparation of Polyamide Reverse Osmosis Composite Membrane

Embodiment 1

A support layer prepared by a phase inversion method, after poly sulfone was coated on non-woven fabric, was submerged for 1 minute in amine aqueous solution which contained 2.0 weight % of 1,3-phenylenediamine (MPD), 1.0 weight % of N,N,N',N'-tetrakis(2-hydroxylpropyl)ethylenediamine (TKHPEA), and 1.6 weight % of camphorsulfonic acid (CSA). Surplus solution of the polysulfone support layer was removed using a rubber roller, and then it was submerged in Isopar C organic solution (Exxon incorporation), which included 0.1 weight % of trimesoyl chloride (TMC), for 10 seconds and was dried at 95° C. for 5 minutes for thereby preparing polyamide reverse osmosis composite membrane.

Embodiments 2 Through 5

A polyamide reverse osmosis composite membrane was prepared by the same method as the embodiment 1, except for that the added amount of TKHPEA contained in the amine aqueous solution was in a range of 0.1 through 10 weight %. Here, in the case of strong acid CSA contained in the amine aqueous solution, it was added at a composition ratio of 1:1 based on the added amount of TKHPEA. In the embodiments 2 through 5, the added amounts of TKHPEA were shown in Table 1.

TABLE 1

| Classification | TKHPEA (weight %) |
| --- | --- |
| Embodiment 2 | 0.1 |
| Embodiment 3 | 2.0 |
| Embodiment 4 | 5.0 |
| Embodiment 5 | 10.0 |

Embodiments 6 Through 15

The polyamide reverse osmosis composite membrane prepared by the same method as the embodiment 1 was dried at the conditions of Table 2. The drying conditions of the embodiments 6 through 15 are shown in the following Table 2.

TABLE 2

| Classification | Drying temperature (° C.) | Drying time (minutes) |
| --- | --- | --- |
| Embodiment 6 | Room temperature | 3 |
| Embodiment 7 | 60 | 3 |
| Embodiment 8 | 70 | 3 |
| Embodiment 9 | 80 | 3 |
| Embodiment 10 | 90 | 3 |
| Embodiment 11 | 100 | 3 |
| Embodiment 12 | 95 | 1 |
| Embodiment 13 | 95 | 3 |
| Embodiment 14 | 95 | 7 |
| Embodiment 15 | 95 | 10 |

Embodiments 16 and 17

A polyamide reverse osmosis composite membrane was prepared by the same method as the method of embodiment 3 using the multifunctional tertiary alcohol amine of Table 3 instead TKHPEA included in the amine aqueous solution.

TABLE 3

| classification | Alcohol amine | acid | Water permeability (L/m²hr) | Salt rejection (%) |
| --- | --- | --- | --- | --- |
| Embodiment 16 | TKHEEA | CSA | 77.3 | 98.2 |
| Embodiment 17 | PKHPDETA | CSA | 72.2 | 97.8 |

In the table 3,
TKHEEA: N,N,N',N'-tetrakis(2-hydroxyethyl)ethylenediamine
PKHPDETA: N,N,N',N'',N'''-pentakis(2-hydroxypropyl)diethylenetriamine
CSA: Camphorsulfonic acid

Embodiment 18

In the post treatment step, the polyamide reverse osmosis composite membrane prepared by the method of the embodiment 1 was submerged in 10 weight % of TKHPEA water aqueous solution for 10 minutes and was dried for 5 minutes in an oven for thereby preparing a polyamide reverse osmosis composite membrane.

Comparison Example 1

Polysulfone support was submerged in amine aqueous solution containing 2.0 weight % of MPD, and surplus amine aqueous solution was removed from the surface of the support. It was interfacial-polymerized with freon organic solution (FREON TF) on the surface for 10 seconds, with 0.1 weight % of TMC being dissolved in the freon organic solution.

Comparison Example 2

Amine aqueous solution was prepared by dissolving 2.0 weight % of MPD, 0.25 weight % of sodium laurylsulfate (SLS), 4.0 weight % of CSA and 2.0 weight % of triethylamine (TEA) in mixed solution in which composition ratio of water/ethanol was 80/20. Porous polysulfone support was submerged in the amine aqueous solution, and surplus amine aqueous solution was removed. It was contacted with organic solution in which 0.1 weight % of TMC and 0.1 weight % of isophthalic chloride (IPC) was dissolved, and interfacial polymerization was performed at 120° C. for 5 minutes for thereby preparing reverse osmosis composite membrane.

Comparison Example 3

A porous support was submerged in amine aqueous solution which contains 3.0 weight % of MPD, 3.0 weight % of N-methylpyrrolidone (NMP) and 100 ppm of Na $CO_3$, and it was contacted with naphtha solution in which 0.1 weight % of TMC was dissolved for thereby preparing a polyamide reverse osmosis composite membrane based on the interfacial polymerization.

Comparison Example 4

A porous support was submerged in amine aqueous solution which contains 3.5 weight % of MPD, and surplus amine aqueous was removed. It was contacted with naphtha solution, in which 0.14 weight % of TMC was dissolved, for thereby preparing a polyamide reverse osmosis composite membrane based on interfacial polymerization. The membrane was submerged in 1.0 weight % of citric acid solution for 15 minutes and was dried in an oven for 15 minutes for thereby preparing a polyamide reverse osmosis composite membrane.

Comparison Example 5

A micro porous polysulfone support was submerged in amine aqueous solution for 2 minutes, with the amine aqueous solution containing 2.0 weight % of MPD, 2.0 weight % of tetramethylammonoum hydroxide (TMAH), and 0.1 weight % of sodium dodecyl benzyl sulfonate (SDBS), and then surplus amine aqueous solution was removed. It was contacted with Isopar C organic solution (Exxon incorporation), with 0.05 weight % of TMC and 0.075 weight % of IPC being dissolved therein, and was dried at 95 for 6 minutes for thereby preparing a polyamide reverse osmosis composite membrane.

Comparison Example 6

A porous polysulfone support was submerged for 40 seconds in amine aqueous solution, which contained 1.6 weight % of MPD, 0.6 weight % of N,N,N',N'-tetramethyl-1,6-hexanediamine (TMHD), and 0.06 weight % of toluenesulfonic acid (TSA), and surplus amine aqueous solution was removed. It was interfacial-polymerized with Isopar C (Exxon incorporation) organic solution on the surface of the support, with 0.1 weight % of TMC being dissolved in the Isopar organic solution, for thereby preparing a polyamide reverse osmosis composite membrane.

Comparison Example 7

A porous polysulfone support was submerged in amine aqueous solution for 40 seconds, with the amine aqueous solution containing 2.0 weight % of MPD, 2.3 weight % of CSA, 1.1 weight % of TEA and 2.0 weight % of dimethyl suloxide (DMSO), and then surplus amine aqueous solution was removed. It was interfacial-polymerized with Isopar C (Exxon incorporation) organic solution, with 0.1 weight % of TMC being dissolved in the Isopar C organic solution, and was dried for 3 minutes 30 seconds at 95° C. for thereby preparing a polyamide reverse osmosis composite membrane.

Comparison Example 8

In the post treatment step, the prepared FT-30 (FilmTec Incorporation) reverse osmosis composite membrane was submerged in 100 weight % of triethanolamine (TEA) solution at 60° C. for 1 hour for thereby preparing a polyamide reverse osmosis composite membrane.

2. Measurements of Water Permeability and Salt Rejection Rate of Polyamide Reverse Osmosis Composite Membrane The water permeability and salt rejection rate of the polyamide reverse osmosis composite membrane prepared in the embodiments 1 trough 18 and comparison examples 1 through 8 were measured using 2000 ppm NaCl aqueous solution under pressure of 225 psi. A result of the measurement is shown in Table 4.

TABLE 4

| Classification | Water permeability (L/m²hr) | Salt rejection (%) |
| --- | --- | --- |
| Embodiment 1 | 82.0 | 99.0 |
| Embodiment 2 | 73.2 | 98.9 |
| Embodiment 3 | 75.3 | 98.3 |
| Embodiment 4 | 76.2 | 96.8 |
| Embodiment 5 | 71.5 | 98.9 |
| Embodiment 6 | 70.5 | 99.2 |
| Embodiment 7 | 75.2 | 98.2 |
| Embodiment 8 | 76.9 | 96.3 |
| Embodiment 9 | 71.3 | 97.5 |
| Embodiment 10 | 79.2 | 98.4 |
| Embodiment 11 | 75.5 | 99.1 |
| Embodiment 12 | 78.3 | 97.5 |
| Embodiment 13 | 75.2 | 97.2 |
| Embodiment 14 | 78.6 | 97.4 |
| Embodiment 15 | 76.8 | 98.1 |
| Embodiment 16 | 77.3 | 98.2 |
| Embodiment 17 | 72.2 | 97.8 |
| Embodiment 18 | 88.0 | 98.5 |
| Comparison example 1 | 60.2 | 99.5 |
| Comparison example 2 | 41.7 | 99.5 |
| Comparison example 3 | 69.1 | 97.0 |
| Comparison example 4 | 39.1 | 98.0 |
| Comparison example 5 | 34.2 | 99.7 |
| Comparison example 6 | 66.1 | 97.0 |
| Comparison example 7 | 68.0 | 98.2 |
| Comparison example 8 | 36.7 | 91.1 |

As seen in the above table 4 based on the embodiments and comparison examples, in the polyamide reverse osmosis composite membrane according to the present invention, all the water permeability exceeds 70 (L/m²hr), and all the salt rejection exceed 90%. Therefore, the polyamide reverse osmosis composite membrane according to the present invention can be well adapted to a membrane application condition which needs both high water permeability and salt rejection at the same time.

INDUSTRIAL APPLICABILITY

As described above, in the polyamide reverse osmosis composite membrane according to the present invention, multifunctional tertiary alcohol amine is used in amine aqueous solution as an additive, so that it is possible to prepare a polyamide reverse osmosis composite membrane having a significantly enhanced water permeability and salt rejection as compared to the conventional art in which various kinds of additives are used.

In addition, the multifunctional tertiary alcohol amine water aqueous solution used in the amine aqueous solution as additive can be used in the post treatment, and a drying process can be performed at a high temperature of above 85° C., so that significantly enhanced salt rejection and water permeability can be obtained in the polyamide reverse osmosis composite membrane.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. An amine aqueous solution for forming an active layer of a polyamide reverse osmosis composite membrane, characterized in that the amine aqueous solution consists of 0.1 through 20 weight % of polyfunctional aromatic amine monomer, 0.1 through 20 weight % of multifunctional tertiary alcohol amine, 0.1 through 20 weight % of acid, and 40 through 99.7 weight % of water, and said multifunctional tertiary alcohol amine is N,N,N',N'-tetrakis(2-hydroxyl propyl)ethylenediamine or N,N,N',N'',N'''-pentakis(2-hydroxypropyl)diethylenetriamine.

2. The solution of claim 1, wherein said polyfunctional aromatic amine monomer is selected from the group consisting of 1,4-phenylenediamine, 1,3-phenylenediamine, 2,5-diaminotoluene, diphenyl diamine, and 4-methoxy-m-phenylenediamine.

3. In a method for preparing a polyamide reverse osmosis composite membrane by interfacial-polymerizing amine aqueous solution with amine reactive compound, the improvement comprising:

(a) preparing amine aqueous solution consisting of 0.1 through 20 weight % of polyfunctional aromatic amine monomer, 0.1 through 20 weight % of multifunctional tertiary alcohol amine, 0.1 through 20 weight % of acid, and 40 through 99.7 weight % of water; and (b) forming an active layer based on an interfacial polymerization in such a manner that organic solution of amine reactive compound containing 0.01 through 10 weight % of polyfunctional acylhalide monomer, which is amine reactive compound, is contacted with a surface of a porous support, and said multifunctional tertiary alcohol amine is N,N,N',N'-tetrakis(2-hydroxyl propyl)ethylenediamine or N,N,N',N'',N'''-pentakis(2-hydroxypropyl)diethylenetriamine.

4. The method of claim 3, wherein after said active layer is formed, a post treatment step is further performed in such a manner that the active layer of a reverse osmosis composite membrane formed with an interfacial polymerization is contacted with aqueous solution containing 0.1 through 100 weight % of multifunctional tertiary alcohol amine.

5. The method claim 4, further comprising a step for drying the reverse osmosis composite membrane after said post-treatment step is performed.

6. The method of claim 5, wherein said drying step of the reverse osmosis composite membrane is performed at a temperature of 85 through 150° C. for 10 seconds through 1 hour.

7. The method of claim 3, wherein said polyfunctional aromatic amine monomer is selected from the group consisting of 1,4-phenylenediamine, 1,3-phenylenediamine, 2,5-diaminotoluene, diphenyl diamine, and 4-methoxy-m-phenylenediamine.

8. The method of claim 3, wherein said polyfunctional acylhalide, which is amine reactive compound, is selected from the group consisting of trimesoyl chloride, terephthaloyl chloride, and isophthalolyl chloride.

9. The method of claim 3, wherein a reaction mole ratio between multifunctional tertiary alcohol amine and strong acid based on the number (n) of tertiary amine contained in multifunctional tertiary alcohol amine in amine aqueous solution is 1:1 or 1:n.

* * * * *